United States Patent
Yako et al.

(10) Patent No.: US 10,663,965 B2
(45) Date of Patent: May 26, 2020

(54) PERMISSIONS FOR PARTIALLY AUTONOMOUS VEHICLE OPERATION

(71) Applicant: Ford Global Technologies, LLC, Dearborn, MI (US)

(72) Inventors: Sarra Awad Yako, Allen Park, MI (US); Levasseur Tellis, Southfield, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 154 days.

(21) Appl. No.: 15/254,052

(22) Filed: Sep. 1, 2016

(65) Prior Publication Data
US 2018/0059663 A1    Mar. 1, 2018

(51) Int. Cl.
| | |
|---|---|
| G05D 1/00 | (2006.01) |
| B60W 50/12 | (2012.01) |
| B60K 28/02 | (2006.01) |
| G06K 9/00 | (2006.01) |
| B60W 50/00 | (2006.01) |
| B60W 40/08 | (2012.01) |
| H04L 29/08 | (2006.01) |
| H04L 29/06 | (2006.01) |

(52) U.S. Cl.
CPC .......... *G05D 1/0088* (2013.01); *B60K 28/02* (2013.01); *B60W 50/12* (2013.01); *G05D 1/0061* (2013.01); *G06K 9/00845* (2013.01); *B60W 2040/0809* (2013.01); *B60W 2050/0064* (2013.01); *B60W 2540/28* (2013.01); *B60W 2550/20* (2013.01); *H04L 67/12* (2013.01); *H04L 67/42* (2013.01)

(58) Field of Classification Search
CPC .............. G05D 1/0088; G05D 1/0061; G06K 9/00845; H04L 67/12; H04L 67/42
See application file for complete search history.

(56) References Cited

U.S. PATENT DOCUMENTS

| 7,812,712 | B2 | 10/2010 | White et al. | |
|---|---|---|---|---|
| 10,061,315 | B2* | 8/2018 | Yako | B60W 50/08 |
| 10,134,278 | B1* | 11/2018 | Konrardy | G08G 1/166 |
| 10,173,693 | B2* | 1/2019 | Barke | B60W 50/082 |
| 10,246,097 | B1* | 4/2019 | Fields | B60W 50/045 |
| 2007/0158128 | A1 | 7/2007 | Gratz et al. | |

(Continued)

FOREIGN PATENT DOCUMENTS

| DE | 102014205830 A1 | 10/2015 |
|---|---|---|
| JP | 2016130091 A | 7/2016 |

(Continued)

OTHER PUBLICATIONS

UK Search Report dated Feb. 19, 2018; re GB Application 1713491.7.

*Primary Examiner* — Donald J Wallace
(74) *Attorney, Agent, or Firm* — Frank A. MacKenzie; Bejin Bieneman PLC

(57) ABSTRACT

A vehicle system includes an autonomous mode controller and a processor. The autonomous mode controller is programmed to control a host vehicle in a partially autonomous mode. The processor is programmed to identify a driver, determine whether the driver is authorized to operate the host vehicle in the partially autonomous mode, and disable the partially autonomous mode if the driver is not authorized to operate the host vehicle in the partially autonomous mode.

19 Claims, 2 Drawing Sheets

(56) References Cited

U.S. PATENT DOCUMENTS

| | | | |
|---|---|---|---|
| 2007/0198145 A1* | 8/2007 | Norris | B60T 7/22 |
| | | | 701/23 |
| 2014/0309863 A1 | 10/2014 | Ricci | |
| 2015/0066284 A1 | 3/2015 | Yopp | |
| 2015/0149017 A1 | 5/2015 | Allard et al. | |
| 2015/0149018 A1 | 5/2015 | Allard et al. | |
| 2015/0149023 A1 | 5/2015 | Attard et al. | |
| 2016/0026182 A1 | 1/2016 | Boroditsky et al. | |
| 2016/0129908 A1* | 5/2016 | Harda | G05D 1/0088 |
| | | | 701/24 |
| 2016/0304124 A1* | 10/2016 | Fujiyoshi | B62D 1/286 |
| 2017/0277182 A1* | 9/2017 | May | B60W 50/087 |

FOREIGN PATENT DOCUMENTS

| | | |
|---|---|---|
| WO | WO 2015099679 A1 | 7/2015 |
| WO | 2016092796 A1 | 6/2016 |

* cited by examiner

PERMISSIONS FOR PARTIALLY AUTONOMOUS VEHICLE OPERATION

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Some drivers may not fully appreciate the limits of autonomous vehicle operation. For example, the driver of a vehicle that can autonomously park itself may not realize that he or she has to manually find a parking spot and manually align the vehicle relative to the parking spot before activating the park assist feature. Therefore, drivers who are not familiar with the different levels of autonomous operation or the limitations of particular autonomous features may, on the one hand, rely too heavily on the vehicle to perform certain actions automatically. In other words, the driver may not provide a driver input needed by the vehicle for the partially autonomous operation. On the other hand, some drivers may not rely enough on the vehicle to perform certain operations, resulting in the driver providing unnecessary driver inputs to the steering wheel, brake pedal, or accelerator pedal, which may interfere with the vehicle's ability to perform certain autonomous operations.

One way to address such issues is with an autonomous operation system that permits certain autonomous operations only when the driver is skilled enough to activate such operations. The autonomous operation system includes an autonomous mode controller and a processor. The autonomous mode controller is programmed to control the vehicle in a partially autonomous mode. The processor is programmed to identify a driver, determine whether the driver is authorized to operate the host vehicle in the partially autonomous mode, and disable the partially autonomous mode if the driver is not authorized to operate the host vehicle in the partially autonomous mode.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
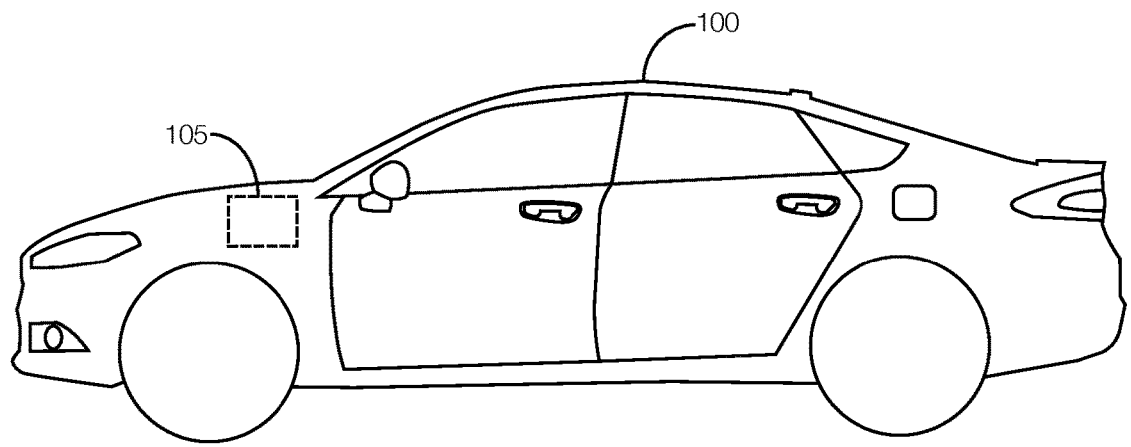
FIG. 1 illustrates an example vehicle with an autonomous operation system for activating certain partially autonomous modes of operation for a particular driver.

As illustrated in FIG. 1, the host vehicle 100 includes an autonomous operation system 105 for activating certain partially autonomous modes of operation for a particular driver. For example, the autonomous operation system 105 may identify a driver, determine whether the driver is authorized to operate the host vehicle 100 in the partially autonomous mode, and either activate or disable the partially autonomous mode accordingly. In some instances, the autonomous operation system 105 may identify the driver immediately when the driver enters the host vehicle 100. Alternatively, the autonomous operation system 105 may identify the driver in response to the driver requesting that the host vehicle 100 operate in the partially autonomous mode.

The autonomous operation system 105 may determine whether the identified driver is authorized to operate the host vehicle 100 in the partially autonomous mode according to permissions associated with the identified driver. The permissions may be determined by the autonomous operation system 105 based on the skill level of the driver, based on permissions stored in a remote database, based on permissions granted by the vehicle owner, etc. For instance, the vehicle owner may upload permissions for the driver to the remote database or an on-board vehicle database. This way, a vehicle owner may decide whether others (e.g., children, employees, etc.) who use the host vehicle 100 can operate the host vehicle 100 in the partially autonomous mode.

Although illustrated as a sedan, the host vehicle 100 may include any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode. The partially autonomous mode may refer to the SAE Level 2 mode of operation where the vehicle can control steering, acceleration, and braking under certain circumstances without human interaction. The partially autonomous mode may further refer to the SAE Level 3 mode of operation where the vehicle can handle steering, acceleration, and braking under certain circumstances, as well as monitoring of the driving environment, even though some human interaction is sometimes needed.

Figure 2:
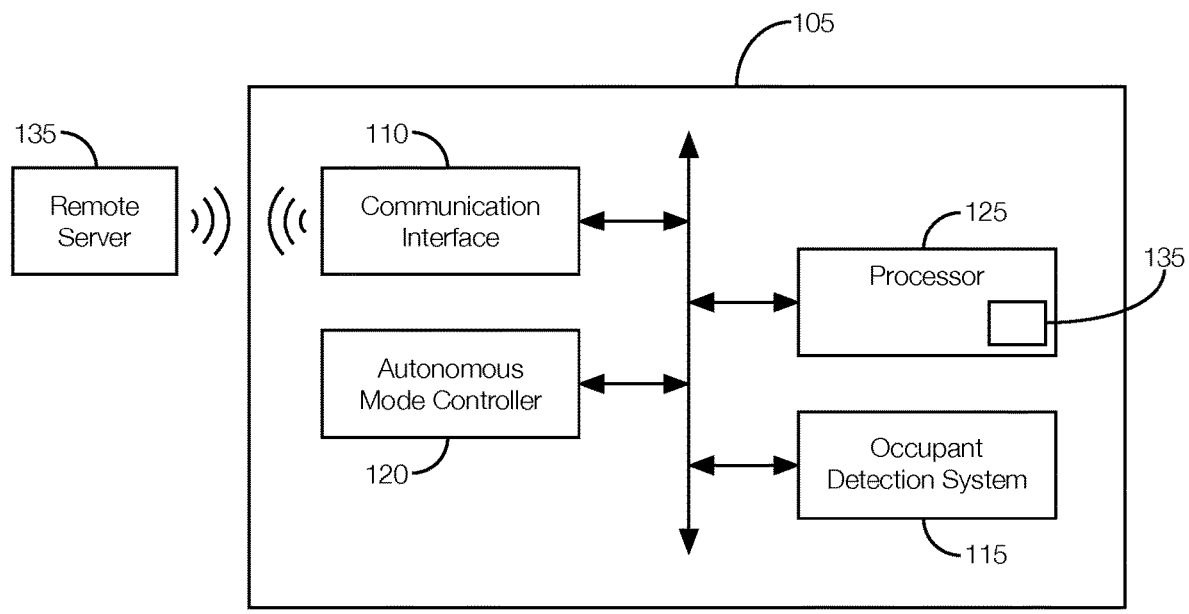
FIG. 2 illustrates example components of the vehicle, including example components of the autonomous operation system.

Referring now to FIG. 2, the autonomous operation system 105 may include or work in conjunction with a communication interface 110, an occupant detection system 115, an autonomous mode controller 120, and a processor 125.

The communication interface 110 is implemented via circuits, chips, or other electronic components that can facilitate wireless communication. The communication interface 110 may be programmed to generate and transmit messages according to any number of wireless communication protocols. For example, the communication interface 110 may be programmed to communicate in accordance with one or more of the Bluetooth®, Bluetooth® Low Energy, Wifi, Dedicated Short Range Communication (DSRC) protocols. In some instances, the communication interface 110 may be programmed to communicate over a cellular or satellite network. For example, in response to a command received from the processor 125, the communication interface 110 may be programmed to wirelessly communicate with a remote server 130 storing a database associating drivers to various permissions. The communication interface 110 may be programmed to receive messages from the remote server 130 and forward those messages to the processor 125.

The occupant detection system 115 is implemented via sensors, circuits, chips, or other electronic components that can detect and identify an occupant. In one possible approach, the occupant detection system 115 may include a camera that captures an image of the driver and identifies the driver from the image. Another option may include the occupant detection system 115 identifying the driver from a key the driver used to access and start the host vehicle 100. Regardless of how the driver is identified, the occupant detection system 115 may output a driver identification signal representing the identity of the driver. In some instances, the driver identification signal may include unique identification associated with the driver. The unique identification may be a unique alphanumeric code assigned to the driver, and as discussed in greater detail below, may be used to identify the permissions associated with the driver.

The autonomous mode controller 120 is implemented via circuits, chips, or other electronic components that can control the host vehicle 100 in fully autonomous or partially autonomous modes of operation. For instance, the autonomous mode controller 120 may be programmed to receive signals from various sensors located on the host vehicle 100 and output control signals to various actuators that control, e.g., the steering, braking, and acceleration in accordance with the sensor signals received. The autonomous mode controller 120 may be programmed to control the host vehicle 100 to implement any one or more of the SAE Levels of autonomous operation.

The processor 125 is implemented via memory 135, circuits, chips, or other electronic components. The memory 135 may store processor 125-executable instructions and make such instructions available to the processor 125. The processor 125 may access and execute the instructions to carry out various operations such as identifying the driver, determining whether the driver is authorized to operate the host vehicle 100 in the partially autonomous mode, and either activating or disabling the partially autonomous mode accordingly (i.e., based on whether the driver is authorized to activate the partially autonomous mode).

The processor 125 may be programmed to identify the driver immediately upon the driver entering the host vehicle 100 or in response to a user input requesting that the host vehicle 100 operate in the partially autonomous mode. The user input requesting that the host vehicle 100 operate in the partially autonomous mode may be received via, e.g., a user interface (e.g., a touchscreen display) located in the host vehicle 100 or a mobile device in communication with the processor 125 via, e.g., the communication interface 110. The processor 125 may be programmed to identify the driver according to a subsequent user input provided by the driver. Like the user input requesting the partially autonomous mode, the subsequent user input may be provided to the user interface or the mobile device in communication with the processor 125 via, e.g., the communication interface 110. The subsequent user input may be provided as a result of the driver selecting among a list of possible drivers and possibly providing credentials to, e.g., prevent the driver from lying about his or her identity. Another way to identify the driver is via the driver identification signal output by the occupant detection system 115. In some instances, the processor 125 may request that the driver confirm his or her identity via a user input to the user interface or the mobile device. Alternatively, the processor 125 may identify the driver from, e.g., the unique identification transmitted by a key used by the driver to access and start the host vehicle 100.

The processor 125 may be further programmed to determine whether the driver is authorized to operate the host vehicle 100 in the partially autonomous mode. Determining whether the driver is authorized to operate the host vehicle 100 in the partially autonomous mode may include the processor 125 querying an on-board database for permissions associated with the driver. Alternatively, the processor 125 may instruct the communication interface 110 to transmit the unique identification to the remote server 130 and query the database stored at the remote server 130 for the permissions associated with the unique identification. The processor 125 may receive the permissions from the remote server 130 via the communication interface 110, and the permissions may indicate whether the driver is authorized to operate the host vehicle 100 in the partially autonomous mode. The permissions may be based on authorization granted by the vehicle owner and uploaded to the remote server 130 or an on-board vehicle database. Alternatively, the permissions may be determined by the processor 125 based on factors such as the driving experience of the identified driver, whether the identified driver has completed appropriate training on the partially autonomous modes of operation, or the like.

The processor 125 may be programmed to disable the partially autonomous mode if the driver is not authorized to operate the host vehicle 100 in the partially autonomous mode. Disabling the partially autonomous mode may include the processor 125 outputting an autonomous mode disable signal to the autonomous mode controller 120. The autonomous mode disable signal may prevent the autonomous mode controller 120 from allowing the host vehicle 100 to operate in one or more of the partially autonomous modes. In some possible implementations, the autonomous mode disable signal may not prevent the autonomous mode controller 120 from allowing the host vehicle 100 to operate in one or more of the fully autonomous modes of operation (e.g., SAE levels 4-5) or non-autonomous modes of operation (e.g., SAE levels 0-1). If the partially autonomous operations are prevented, the processor 125 may command, e.g., the user interface to present a notification to the driver indicating that the partially autonomous operations were prevented and, in some instances, may further include an explanation (e.g., the driver lacks sufficient authorization to operate the host vehicle 100 in a partially autonomous mode).

The processor 125 may be programmed to permit partially autonomous modes of operation at, e.g., the next key cycle or an updated authorization granted by, e.g., the vehicle owner. Permitting the partially autonomous modes may include the processor 125 outputting a signal to the autonomous mode controller 120 that instructs the autonomous mode controller 120 to permit partially autonomous modes of operation. The signal may in some possible approaches clear a flag set by the autonomous deactivation signal that previously disabled the partially autonomous mode of operation.

Figure 3:
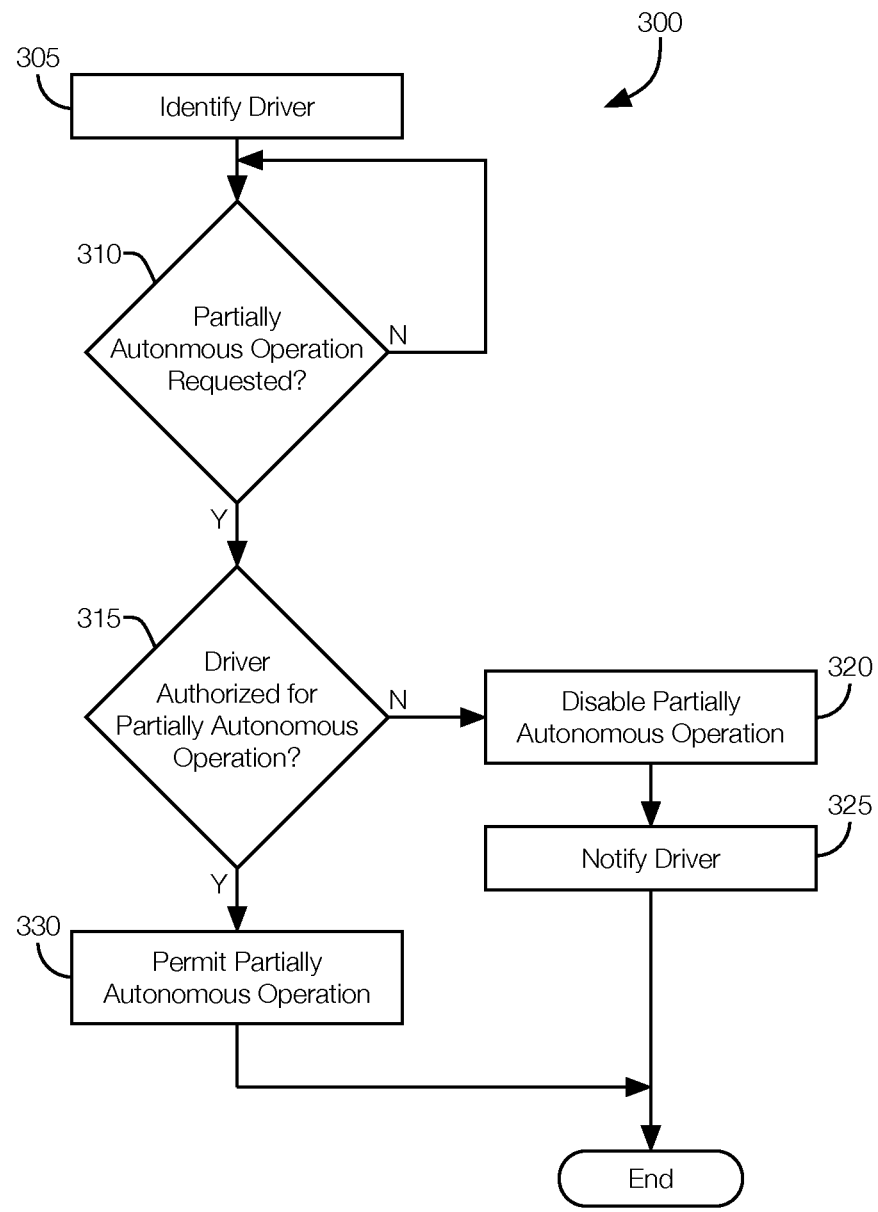
FIG. 3 is a flowchart of an example process that may be executed by the autonomous operation system to determine whether to permit certain partially autonomous operations for a particular driver.

FIG. 3 is a flowchart of an example process 300 that may be executed by the autonomous operation system 105 to, e.g., activate certain partially autonomous modes of operation for a particular driver. The process 300 may begin at any time while the host vehicle 100 is running. The process 300 may run once or multiple times within a single key cycle.

At block 305, the autonomous operation system 105 identifies the driver. Specifically, the processor 125 may identify the driver according to the driver identification signal, representing a unique identification associated with the driver, output by the occupant detection system 115. Alternatively, the driver may be identified in response to a user input, e.g., selecting the driver, or a unique identification associated with the driver, provided to a user interface. In yet another alternative, the driver may be identified according to a key used by the driver to unlock or start the host vehicle 100. The process 300 may proceed to block 310 after the driver has been identified. In some instances, the driver may be identified after block 310, meaning that the driver is identified in response to the autonomous operation system 105 receiving a user input requesting the partially autonomous mode of operation.

At decision block 310, the autonomous operation system 105 determines whether the driver has requested a partially autonomous mode of operation. As discussed above, partially autonomous modes of operation may refer to SAE Level 2 or SAE Level 3 modes of operation. The processor 125 may determine that the driver has requested the partially autonomous mode of operation in response to the driver providing a user input, requesting the partially autonomous mode of operation, to the user interface, and the user interface transmitting the user input to the processor 125. That is, the processor 125 may determine that the driver has requested the partially autonomous mode in response to receiving the user input. If the partially autonomous mode of operation is requested, the process 300 may proceed to block 315. Otherwise, the process 300 may continue to execute block 310 until the partially autonomous mode of operation is requested (i.e., the user input requesting the partially autonomous mode of operation is received).

At decision block 315, the autonomous operation system 105 determines whether the driver identified at block 305 is authorized to operate the host vehicle 100 in the partially autonomous mode. The processor 125 may query the database stored at the remote server 130 or an on-board database for permissions associated with the unique identification associated with the identified driver. Querying the database on the remote server 130 may include the processor 125 commanding the communication interface 110 to transmit the unique identification associated with the identified driver to the remote server 130 and receiving, via the communication interface 110, permissions associated with the unique identification from the remote server 130. The processor 125 may process the permissions to determine whether the driver is authorized to operate the host vehicle 100 in the partially autonomous mode. If not, the process 300 may proceed to block 320. If the driver is authorized to operate the host vehicle 100 in the partially autonomous mode, the process 300 may proceed to block 330.

At block 320, the autonomous operation system 105 disables the partially autonomous mode of operation. For instance, the processor 125 may output an autonomous mode disable signal to the autonomous mode controller 120 to disable the partially autonomous mode of operation. The autonomous mode disable signal may prevent the autonomous mode controller 120 from allowing the host vehicle 100 to operate in one or more of the partially autonomous modes. In some possible implementations, the autonomous mode disable signal may not prevent the autonomous mode controller 120 from allowing the host vehicle 100 to operate in one or more of the fully autonomous modes of operation (e.g., SAE levels 4-5) or non-autonomous modes of operation (e.g., SAE levels 0-1).

At block 325, the autonomous operation system 105 notifies the driver that the partially autonomous mode of operation has been disabled. For instance, the processor 125 may command, e.g., the user interface to present a notification to the driver indicating that the partially autonomous operations were prevented and, in some instances, may further include an explanation (e.g., the driver lacks sufficient authorization to operate the host vehicle 100 in a partially autonomous mode). The process 300 may end after block 325.

At block 330, the autonomous operation system 105 permits the partially autonomous mode of operation. Permitting the partially autonomous modes may include the processor 125 outputting a signal to the autonomous mode controller 120 that instructs the autonomous mode controller 120 to permit partially autonomous modes of operation. The signal may, in some possible approaches, clear a flag set by the autonomous deactivation signal that previously disabled the partially autonomous mode of operation during, e.g., a previous iteration of the process 300. The process 300 may end after block 330.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
an autonomous mode controller programmed to control a host vehicle in a partially autonomous mode; and
a processor programmed to
identify a driver,
receive a user input selecting the partially autonomous mode of operation from available modes of operation that include a fully autonomous mode of operation, the partially autonomous mode of operation, and a non-autonomous mode of operation, the partially autonomous mode providing for control of one of steering or acceleration without controlling the other of steering or acceleration;
determine whether the driver is authorized to operate the host vehicle in the partially autonomous mode based on permissions set by a vehicle owner, and
disable the partially autonomous mode but continue to allow each of the fully autonomous and non-autonomous modes if, according to the permissions set by the vehicle owner, the driver is not authorized to operate the host vehicle in the partially autonomous mode,
wherein the permissions are associated with the driver.

2. The vehicle system of claim 1, wherein the processor is programmed to identify the driver in response to receiving the user input.

3. The vehicle system of claim 1, wherein the processor is programmed to identify the driver based at least in part on a unique identification associated with the driver.

4. The vehicle system of claim 1, wherein the processor is programmed to identify the driver based at least in part on a driver identification signal received from an occupant detection system.

5. The vehicle system of claim 1, wherein the processor is programmed to identify the driver based at least in part on a key used by the driver to start the host vehicle.

6. The vehicle system of claim 1, wherein the processor is programmed to determine if the driver is authorized to operate the host vehicle by querying a remote server for the permissions set by the vehicle owner and associated with the driver.

7. The vehicle system of claim 6, further comprising a communication interface, and wherein querying the remote server includes the processor instructing the communication interface to transmit a unique identification associated with the driver to the remote server.

8. The vehicle system of claim 7, wherein the permissions are further associated with the unique identification and wherein the processor is programmed to receive the permissions associated with the unique identification from the remote server via the communication interface.

9. The vehicle system of claim 1, wherein disabling the partially autonomous mode includes the processor outputting an autonomous mode disable signal to the autonomous mode controller.

10. A method comprising:
identifying a driver of a host vehicle;
receiving a user input selecting a partially autonomous mode of operation from available modes of operation that include a fully autonomous mode of operation, the partially autonomous mode of operation, and a non-autonomous mode of operation, the partially autonomous mode providing for control of one of steering or acceleration without controlling the other of steering or acceleration;
determining whether the driver is authorized to operate the host vehicle in the partially autonomous mode based on permissions set by a vehicle owner, wherein the permissions are associated with the driver; and
disabling the partially autonomous mode, but continuing to allow each of the fully autonomous and non-autonomous modes, as a result of determining, according to the permissions set by the vehicle owner, that the driver is not authorized to operate the host vehicle in the partially autonomous mode.

11. The method of claim 10, wherein the driver is identified in response to receiving the user input.

12. The method of claim 10, wherein the driver is identified based at least in part on a unique identification associated with the driver.

13. The method of claim 10, wherein the driver is identified based at least in part on a driver identification signal received from an occupant detection system.

14. The method of claim 10, wherein the driver is identified based at least in part on a key used by the driver to start the host vehicle.

15. The method of claim 10, wherein determining if the driver is authorized to operate the host vehicle includes querying a remote server for the permissions set by the vehicle owner and associated with the driver.

16. The method of claim 15, wherein querying the remote server includes:
transmitting a unique identification associated with the driver to the remote server; and
receiving, from the remote server, the permissions set by the vehicle owner and associated with the driver as a result of transmitting the unique identification to the remote server.

17. The method of claim 10, wherein disabling the partially autonomous mode includes outputting an autonomous mode disable signal to an autonomous mode controller.

18. A vehicle system comprising:
an occupant detection system programmed to identify a driver of a host vehicle and output a driver identification signal identifying the driver of the host vehicle;
a communication interface programmed to communicate with a remote server;
an autonomous mode controller programmed to control the host vehicle in a partially autonomous mode; and
a processor programmed to
receive a user input selecting a partially autonomous mode of operation from available modes of operation that include a fully autonomous mode of operation, the partially autonomous mode of operation, and a non-autonomous mode of operation, the partially autonomous mode providing for control of one of steering or acceleration without controlling the other of steering or acceleration;
identify the driver in response to receiving the user input based at least in part on the driver identification signal,
determine whether the driver is authorized to operate the host vehicle in the partially autonomous mode by querying a remote server with a unique identification for permissions set by a vehicle owner and associated with the driver, and
disable the partially autonomous mode by outputting an autonomous mode disable signal to the autonomous mode controller, but continue to allow each of the fully autonomous and non-autonomous modes, as a result of determining that the driver is not authorized to operate the host vehicle in the partially autonomous mode according to the permissions set by the vehicle owner.

19. The vehicle system of claim 18, wherein querying the remote server includes the processor instructing the communication interface to transmit the unique identification associated with the driver to the remote server and receiving the permissions associated with the unique identification from the remote server via the communication interface.

* * * * *